United States Patent
Lin et al.

(10) Patent No.: US 7,382,610 B2
(45) Date of Patent: Jun. 3, 2008

(54) MOUNTING APPARATUS FOR DATA STORAGE DEVICE

(75) Inventors: Yang-Ming Lin, Shenzhen (CN); Xiao-Zhong Jing, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 7 days.

(21) Appl. No.: 11/592,769

(22) Filed: Nov. 3, 2006

(65) Prior Publication Data

US 2007/0236878 A1  Oct. 11, 2007

(30) Foreign Application Priority Data

Apr. 7, 2006 (CN) ..................... 200620013483.X

(51) Int. Cl.
 *G06F 1/16* (2006.01)
(52) U.S. Cl. ................ 361/685; 211/26; 361/724; 312/223.1; 248/639
(58) Field of Classification Search ............... 211/26, 211/26.2; 292/113; 248/539, 639, 27.1, 248/225.11; 174/50; 365/151; 312/223.1–223.6; 361/679, 685, 687, 680–684, 724–727; 713/183
See application file for complete search history.

(56) References Cited

U.S. PATENT DOCUMENTS

| 5,605,430 | A | 2/1997 | Legrady |
| 7,088,580 | B2 * | 8/2006 | Chen et al. .................. 361/685 |
| 2007/0176074 | A1 * | 8/2007 | Huang et al. ............... 248/639 |
| 2007/0279860 | A1 * | 12/2007 | Zheng et al. ............... 361/685 |
| 2008/0000849 | A1 * | 1/2008 | Zhang et al. ............... 211/26.2 |

* cited by examiner

*Primary Examiner*—Hung v Duong
(74) *Attorney, Agent, or Firm*—Wei Te Chung

(57) ABSTRACT

A mounting apparatus for mounting a data storage device that defines a fixing hole therein includes a mounting bracket, a locking member, and an operating member. The mounting bracket includes a sideboard, and a first sidewall. The sideboard defines a through hole therein. The locking member arranged between the sideboard and the first sidewall includes a locking pin protruding therefrom. The locking pin is inserted through the through hole of the mounting bracket and configured for engaging in the fixing hole of the data storage device. A top of the locking member is pivotably connected to the mounting bracket. The operating member is arranged between the locking member and the first sidewall, and includes a resilient portion for pressing the locking member inward, and a first clip portion for clipping a bottom of the locking member for drawing the locking member to pivot outward. A top of the operating member is pivotably connected to the mounting bracket.

20 Claims, 7 Drawing Sheets

MOUNTING APPARATUS FOR DATA STORAGE DEVICE

CROSS-REFERENCE TO RELATED APPLICATION

Relevant subject matter is disclosed in the copending U.S. patent application filed on the same date with Ser. No. 11/592847 and having a same title with the present application, which is assigned to the same assignee with this patent application.

BACKGROUND OF THE INVENTION

1. Field of the Invention

The present invention relates to mounting apparatuses, and more particularly to a mounting apparatus which readily allows securely installing or removing a data storage device to or from an electronic device.

2. Description of Related Art

An electronic apparatus, such as a computer, or a server, usually includes data storage devices, such as hard disk drives, compact disk read-only memory (CD-ROM) drives, digital video disc (DVD) drives, and floppy disk drives. These devices are typically added to increase the functionality of the electronic apparatus as desired by a user. However, the installation of such devices in the electronic apparatus is usually labor-intensive.

The installation of a hard disk drive in a computer typically involves using screws to attach the hard disk drive to a bracket on a chassis of the computer. Usually, these screws are so small that it is difficult to install them. It is laborious and time-consuming to manipulate the screws. Additionally, because of their small size, the screws are easier to be dropped by an assembler into the computer. Some accidental damage may occur in the computer.

To address the aforementioned problems, a plurality of mounting apparatuses is invented to reduce the number of needed screws. For example, a pair of detachable rails is attached to opposite sides of a data storage device with screws. The data storage device slides into and is secured to a drive bracket. However, the screws have to be removed to detach the rails from the data storage device before replacing the data storage device.

What is desired, therefore, is a mounting apparatus which readily allows securely installing or removing a data storage device to or from an electronic device.

SUMMARY OF THE INVENTION

In one preferred embodiment, a mounting apparatus for mounting a data storage device defining a fixing hole therein includes a mounting bracket, a locking member, and an operating member. The mounting bracket includes a sideboard, and a first sidewall. The sideboard defines a through hole therein. The locking member arranged between the sideboard and the first sidewall includes a locking pin protruding therefrom. The locking pin is inserted through the through hole of the mounting bracket configured for engaging in the fixing hole of the data storage device. A top of the locking member is pivotably connected to the mounting bracket. The operating member is arranged between the locking member and the first sidewall, the operating member includes a resilient portion for pressing the locking member, and a first clip portion clipping a bottom of the locking member for drawing the locking member to pivot outward. A top of the operating member is pivotably connected to the mounting bracket.

Other advantages and novel features will become more apparent from the following detailed description of preferred embodiments when taken in conjunction with the accompanying drawings, in which:

DETAILED DESCRIPTION OF THE INVENTION

Figure 1:
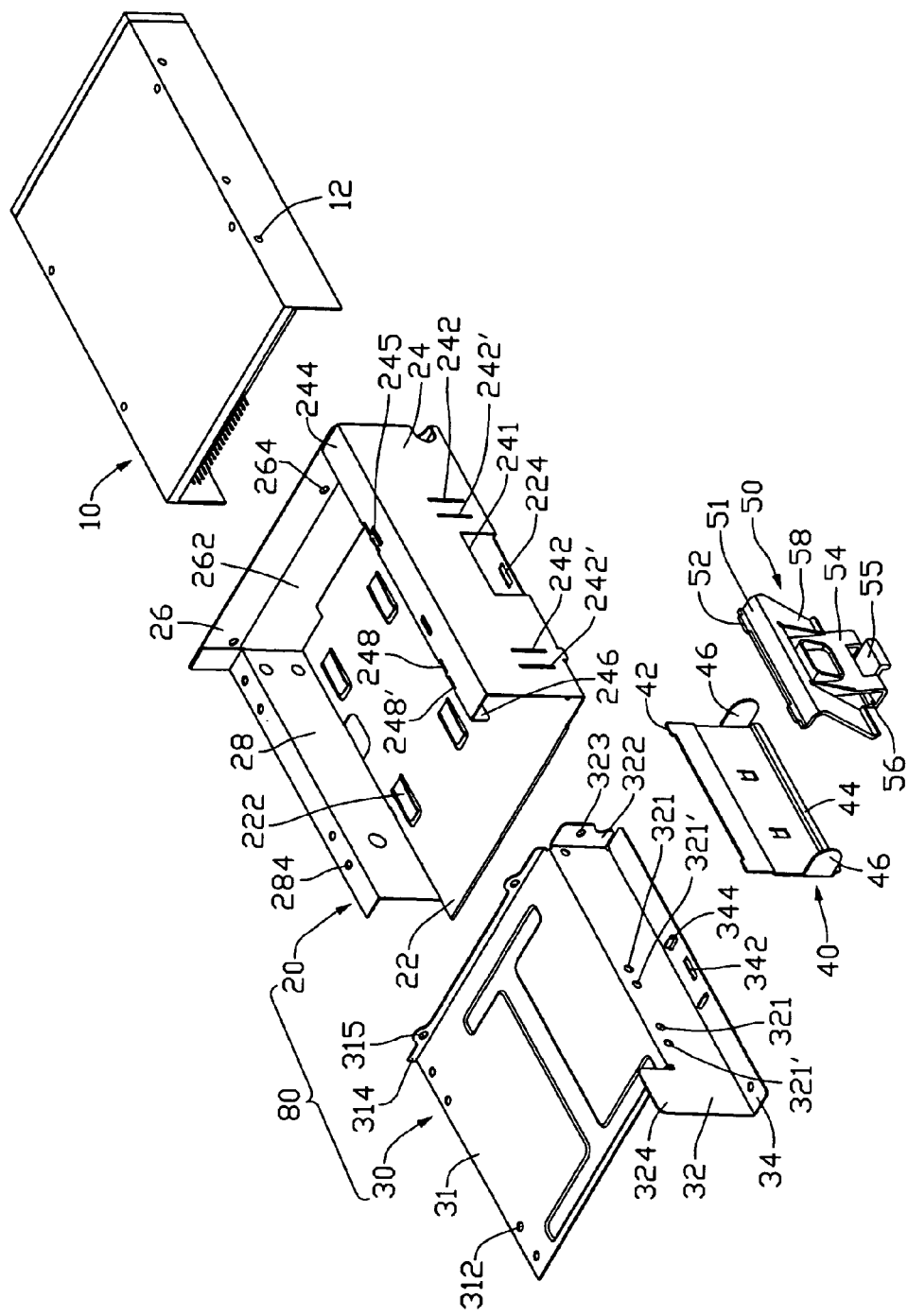
FIG. 1 is an exploded, isometric view of a mounting apparatus in accordance with a preferred embodiment of the present invention, together with a data storage device, the mounting apparatus includes a first bracket, a second bracket, a locking member, and an operating member.
Figure 2:
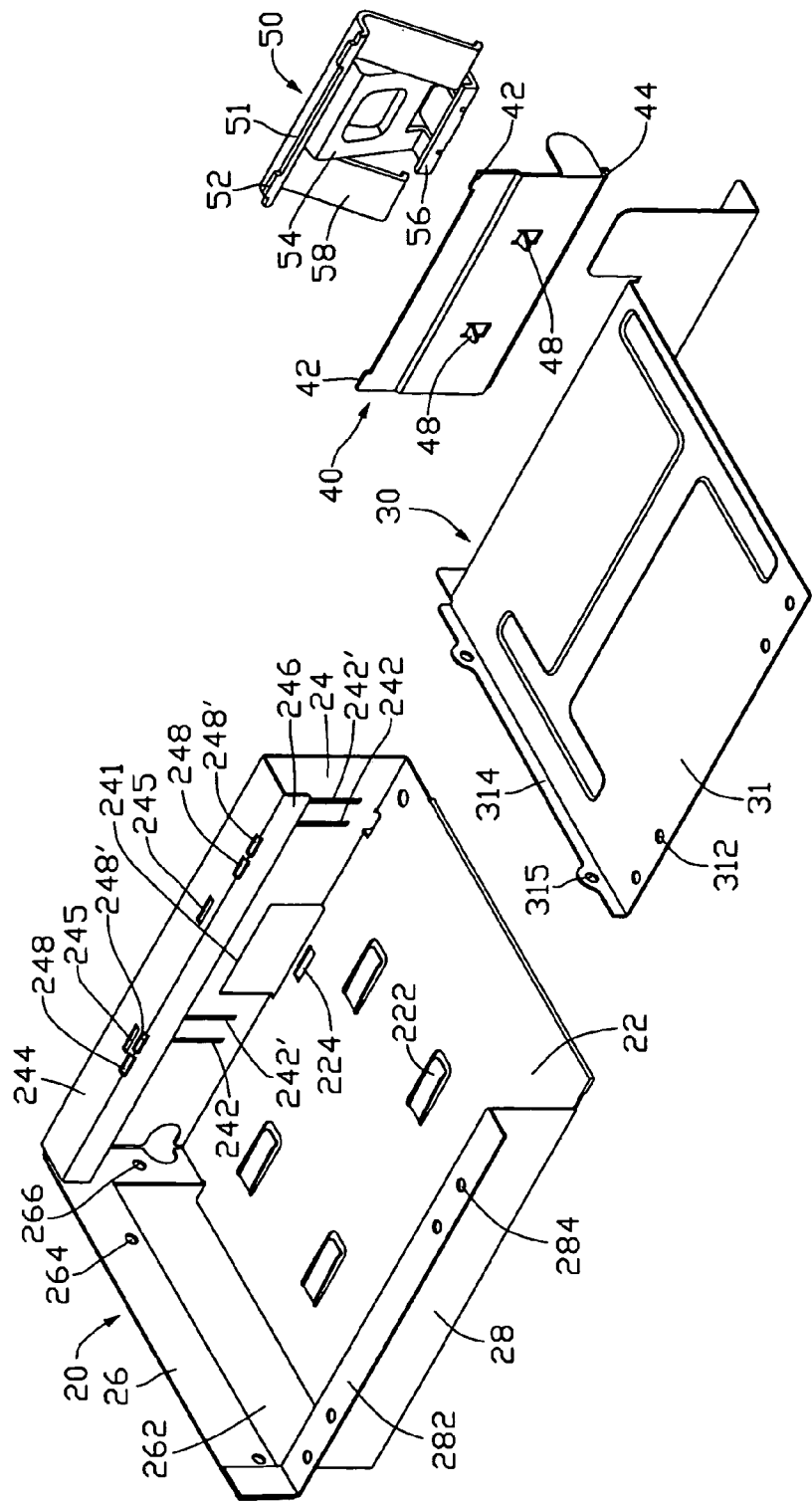
FIG. 2 is similar to FIG. 1, but viewed from another aspect and not showing the data storage device.
Figure 3:
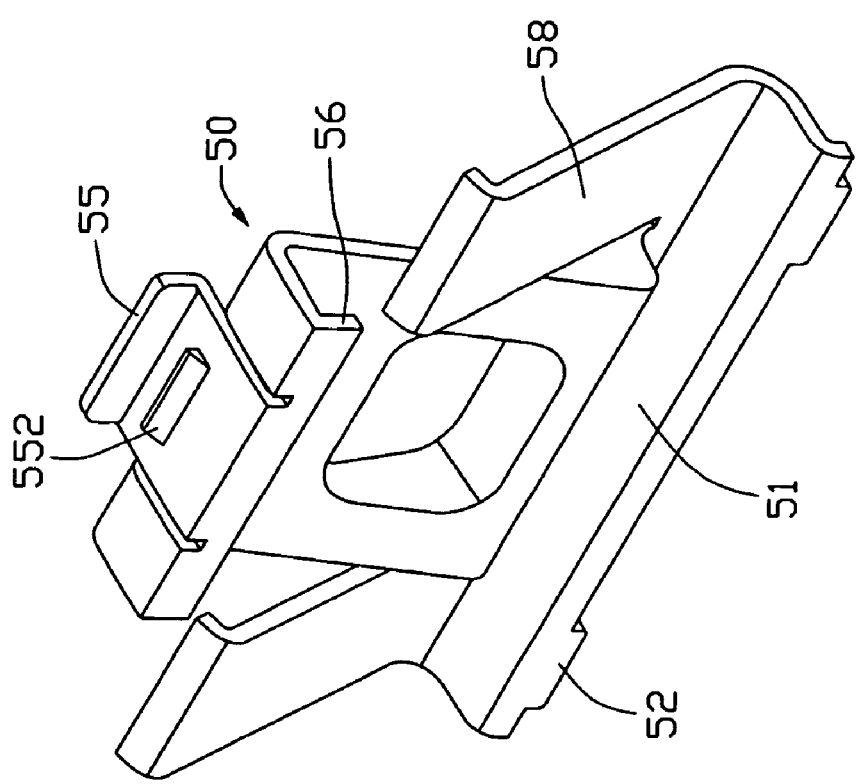
FIG. 3 is an inverted and enlarged view of the operating member of FIG. 1.

Referring to FIG. 1 to FIG. 3, in a preferred embodiment of the present invention, a mounting apparatus is provided for mounting a data storage device 10. The data storage device 10 defines two fixing holes 12 in a sidewall. The mounting apparatus includes a mounting bracket 80, a locking member 40, an operating member 50, and a plurality of fasteners, such as rivets 90 (shown in FIG. 5). The mounting bracket 80 includes a first bracket 20, and an L-shaped second bracket 30.

The first bracket 20 includes a base wall 22, a first sidewall 24 perpendicularly extending from a side of the base wall 22, and a second sidewall 26 abutting on the first sidewall 24 and perpendicularly extending from an end of the base wall 22, and a third sidewall 28 abutting on the second sidewall 26 and perpendicularly extending from an opposite side of the base wall 22. A plurality of tongue-shaped tabs 222 slantingly extends out from the base wall 22. A locating hole 224 is defined in a middle of one side of the base wall 22 near the first sidewall 24. A rectangular through hole 241 is defined in the first sidewall 24 corresponding to the locating hole 224 of the base wall 22. Two slots 242 perpendicular to the base wall 22 are defined in the first sidewall 24 and respectively at two opposite sides of the through hole 241. A bending portion 244 perpendicularly extends in from a top of the first sidewall 24. Two first slits 245 are defined in the bending portion 244. A first flange 246 extends down from a free side of the bending portion 244. Two second slits 248 are defined in a junction of the bending portion 244 and the first flange 246. An opening 262 is defined in a bottom of the second sidewall 26. Two fixing holes 264 are defined in the second sidewall 26 over the opening 262. A fixing hole 266 is defined in the second sidewall 26 at one side of the opening 262. A fixing piece 282 perpendicularly extends out from a top of the third sidewall 28. A plurality of fixing holes 284 is defined in the fixing piece 282.

The second bracket 30 includes a top wall 31, a sideboard 32 perpendicularly extending down from a side of the top wall 31. A plurality of fixing holes 312 corresponding to the fixing holes 284 of the first bracket 20 is defined in the top wall 31 at an opposite side. A fixing flange 314 extends up from an end of the top wall 31. Two fixing holes 315 corresponding to the fixing holes 264 of the second sidewall 26 of the first bracket 20 are defined in the fixing flange 314. Two through holes 321 corresponding to the fixing holes 12 of the data storage device 10 are defined in the sideboard 32. A fixing sheet 322 perpendicularly extends out from an end of the sideboard 32. A fixing hole 323 corresponding to the fixing hole 266 of the second sidewall 26 of the first bracket 20 is defined in the fixing sheet 322. A tab 324 extends up from an opposite end of the sideboard 32. A second flange 34 perpendicularly extends out from a bottom of the sideboard 32. Two locating tabs 344 are arranged in a middle of the second flange 34. A rectangular locating hole 342 is defined in the second flange 34 between the two locating tabs 344.

The operating member 50 includes a main body 51. Two first inserting tabs 52 corresponding to the first slits 245 of the first sidewall 24 project up from two opposite ends of a side of the main body 51. An L-shaped supporting portion 54 extends down from a middle portion of an opposite side of the main body 51. A handle portion 55 extends out from a distal end of the supporting portion 54. A locating protrusion 552 projects from a bottom surface of the handle portion 55. A first clip portion 56 extends up from the distal end of the supporting portion 54. Two resilient portions 58 respectively extend down from two opposite ends of the main body 51.

The locking member 40 is plate-shaped. Two second inserting tabs 42 corresponding to the second slits 248 of the first sidewall 24 respectively extend up from two opposite ends of a top of the locking member 40. Two ear portions 46 respectively extend out from two opposite sides of the locking member 40. A second clip portion 44 corresponding to the first clip portion 56 extends from a bottom of the locking member 40. Two locking pins 48 project from a middle of the locking member 40.

Figure 4:
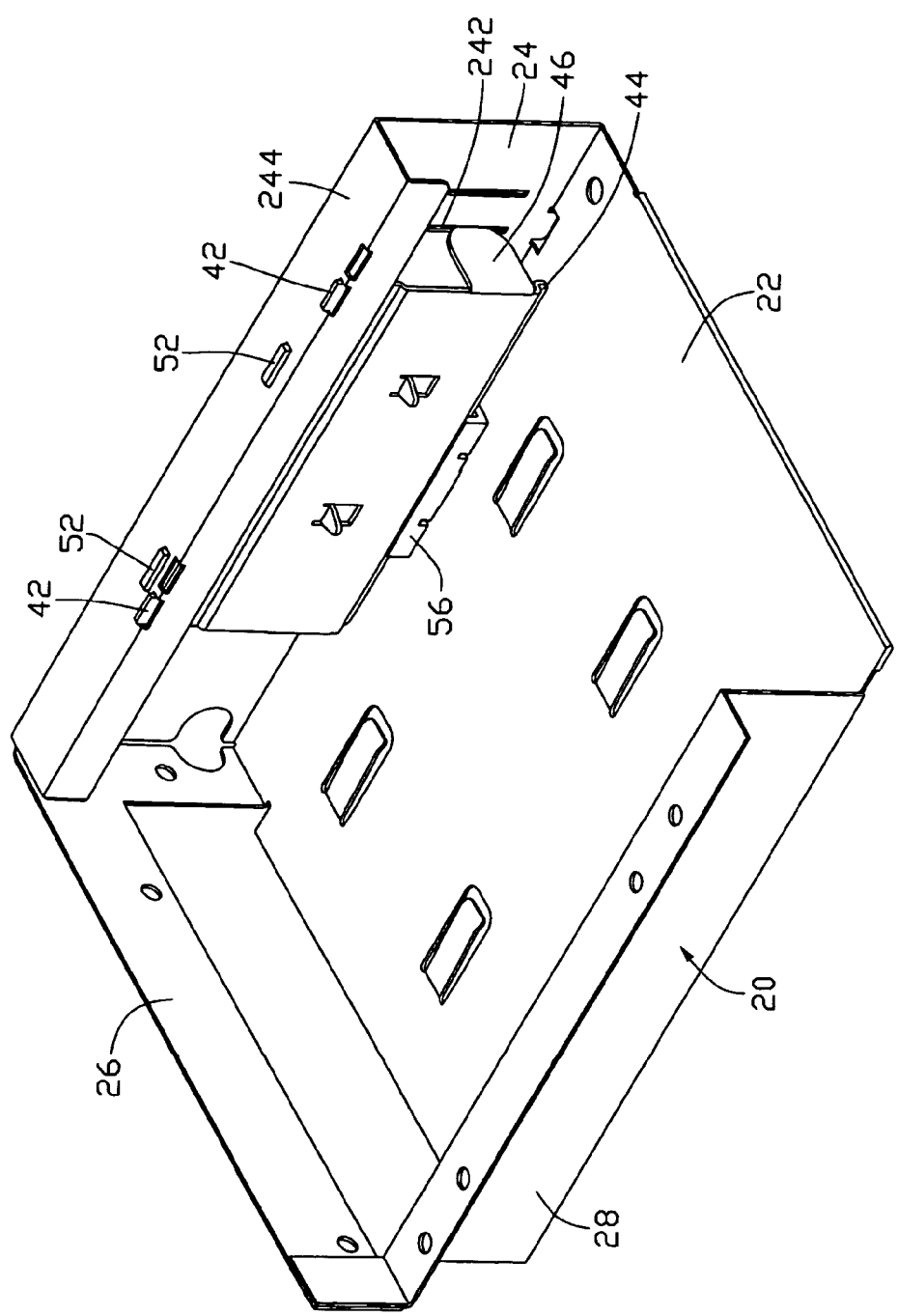
FIG. 4 is an assembled view of the first bracket, the locking member, and the operating member of FIG. 1.
Figure 5:
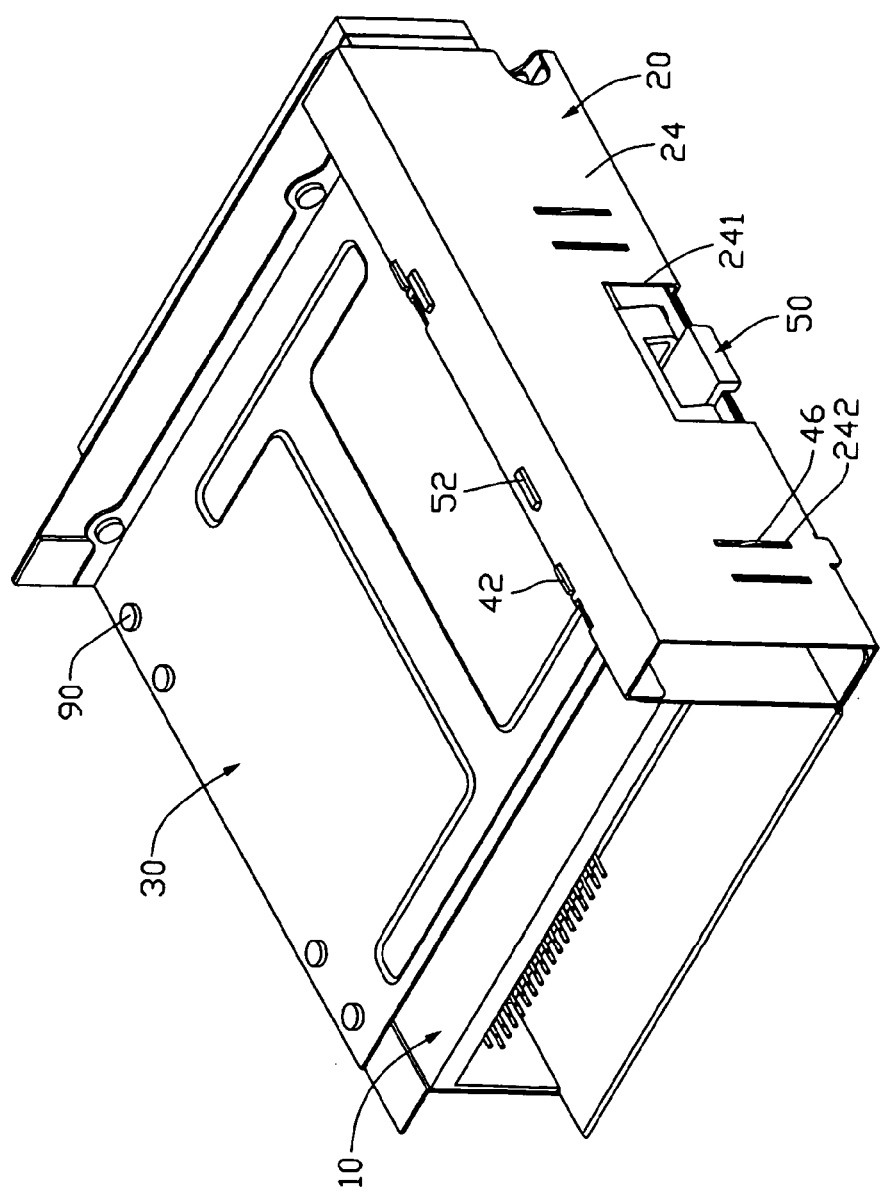
FIG. 5 is an assembled view of FIG. 1.

Referring to FIG. 4 and FIG. 5, in assembly, the two first inserting tabs 52 of the operating member 50 are respectively inserted into the corresponding first slits 245 of the first sidewall 24 of the first bracket 20. The handle portion 55 of the operating member 50 passes through the through hole 241 of the first sidewall 24. The two second inserting tabs 42 of the locking member 40 are respectively inserted into the corresponding second slits 248 of the first sidewall 24. The two ear portions 46 of the locking member 40 are respectively inserted through the corresponding slots 242. The first clip portion 56 of the operating member 50 and the second clip portion 44 of the locking member 40 are clipped together. The second bracket 30 is placed into the first bracket 20. The fixing holes 312 of the second bracket 30 are aligned with the corresponding fixing holes 284 of the first bracket 20. The fixing holes 315 of the second bracket 30 are aligned with the corresponding fixing holes 264 of the first bracket 20. The fixing hole 323 of the second bracket 30 is aligned with the fixing hole 266 of the first bracket 20. The rivets 90 respectively pass through the corresponding fixing holes 312 and 284, 315 and 264, 323 and 266 to mount the second bracket 30 to the first bracket 20. The tab 324 of the second bracket 30 is depressed against the first flange 246 of the first sidewall 24, and the locating hole 342 of the second bracket 30 is aligned with the locating hole 224 of the base wall 22. The locking member 40 and the operating member 50 are placed between the first sidewall 24 of the first bracket 20 and the sideboard 32 of the second bracket 30. The first clip portion 56 of the operating member 50 is located between the two locating tabs 344 of the second bracket 30.

Figure 6:
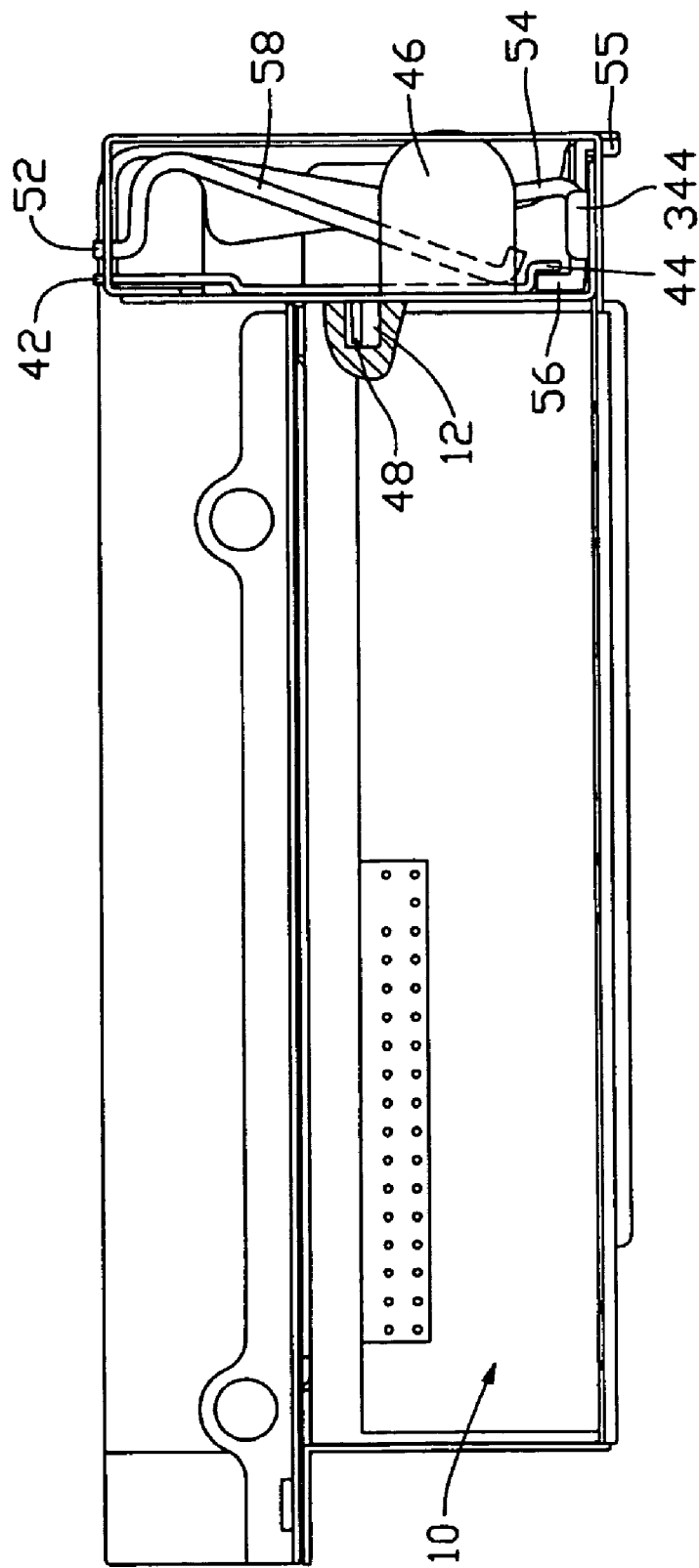
FIG. 6 is a side view of FIG. 5, but partially cut away and showing the mounting apparatus in a locked state.

Also referring to FIG. 6, to mount the data storage device 10 into the mounting bracket 80, the handle portion 55 of the operating member 50 is pulled out through the through hole 241, with the first clip portion 56 of the operating member 50 and the locking member 40 pivoting outward together. The locking pins 48 of the locking member 40 are withdrawn from the through holes 321 of the sideboard 32 of the second bracket 30, and the resilient portions 58 of the operating member 50 depress the locking member 40. The data storage device 10 is placed into the mounting bracket 80 through the opening 262 of the first bracket 20. The data storage device 10 is moved in the mounting bracket 80 until the fixing holes 12 of the data storage device 10 are aligned with the corresponding through holes 321. The handle portion 55 is released. The locking member 40 is returned to its original position under the urging of the resilient portions 58 of the operating member 50 and resiliently abuts against the sidewall of the data storage device 10. The locking pins 48 respectively slide into the corresponding fixing holes 12 of the data storage device 10. The locating protrusion 552 is located in the locating hole 342 of the second bracket 30 and the locating hole 224 of the first bracket 20.

Figure 7:
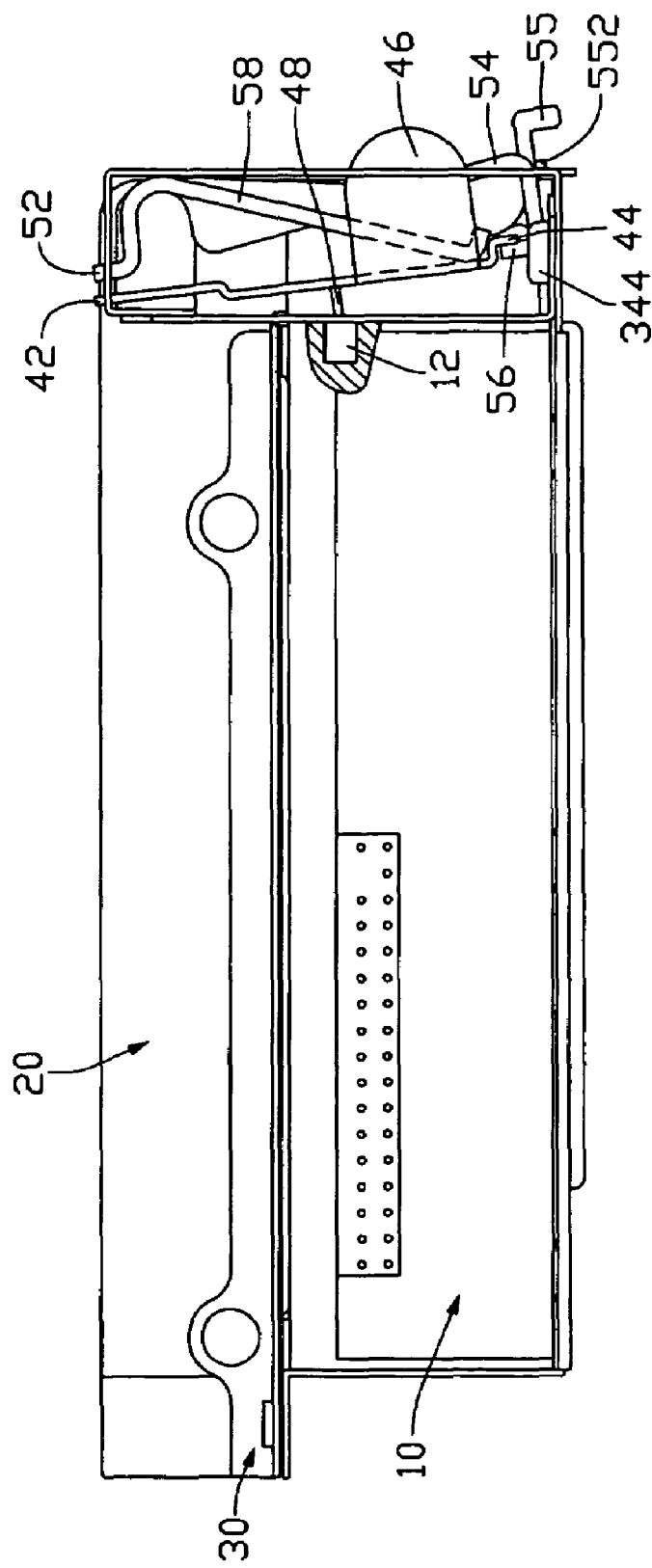
FIG. 7 is similar to FIG. 6, but showing the mounting apparatus in an unlocked state.

Referring to FIG. 7, to detach the data storage device 10 from the mounting bracket 80, the handle portion 55 of the operating member 50 is pulled out through the through hole 241 of the first bracket 20. The locking pins 48 are withdrawn from the fixing holes 12 of the data storage device 10 and the through holes 321 of the second bracket 30. The data storage device 10 is readily removed from the mounting bracket 80 through the opening 262.

In a moving process of the locking member 40, the ear portions 46 of the locking member 40 move in the corresponding slots 242 of the first sidewall 24. The slots 242 are configured for guiding the locking member 40 moving in a predetermined direction.

Referring again to FIG. 1 and FIG. 2, two through holes 321' are defined in the sideboard 32, each with a certain distance from a corresponding through hole 321. Two slots 242' are defined in the first sidewall 24, each with the same certain distance from a corresponding slot 242. Two second slits 248' are defined in the bending portion 244 each with the same certain distance from a corresponding second slit 248. The second inserting tabs 42 of the locking member 40 are respectively inserted into the corresponding second slits 248', with the ear portions 46 being respectively inserted into the corresponding slots 242'. The locking pins 48 are respectively inserted through the corresponding through holes 321'. Thus, the data storage device 10 is selectively mounted at a different place of the mounting bracket 80. The mounting bracket can suit to different data storage devices with fixing holes at different positions since the locking pins 48 have different positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus for mounting a data storage device that defines a fixing hole therein, the mounting apparatus comprising:

a mounting bracket configured for holding the data storage device comprising a sideboard, and a first sidewall, the sideboard defining a through hole therein;

a locking member arranged between the sideboard and the first sidewall of the mounting bracket comprising a locking pin protruding therefrom, the locking pin inserted through the through hole of the mounting bracket for engaging in the fixing hole of the data storage device, a top of the locking member pivotably connected to the mounting bracket; and an operating member arranged between the locking member and the first sidewall, the operating member comprising a resilient portion for pressing the locking member inward, and a first clip portion for clipping a bottom of the locking member, a top of the operating member pivotably connected to the mounting bracket.

2. The mounting apparatus as claimed in claim 1, wherein a flange extends out from a bottom of the sideboard, two locating tabs are arranged on the flange, the operating member further comprises a supporting portion located between the two locating tabs.

3. The mounting apparatus as claimed in claim 2, wherein the operating member still further comprises a locating protrusion, a first locating hole corresponding to the locating protrusion is defined in the flange between the two locating tabs.

4. The mounting apparatus as claimed in claim 3, wherein the mounting bracket further comprises a base wall perpendicular to the first sidewall, and a second locating hole corresponding to the first locating hole of the flange is defined in the base wall.

5. The mounting apparatus as claimed in claim 1, wherein the locking member further comprises a second clip portion, the first clip portion of the operating member is clipped to the second clip portion of the locking member.

6. The mounting apparatus as claimed in claim 1, wherein a through hole is defined in the first sidewall, the operating member further comprises a handle portion extending out through the through hole.

7. The mounting apparatus as claimed in claim 1, wherein a bending portion extends from a top of the first sidewall, a slit is defined in the bending portion, a inserting tab extends up from a top of the operating member, the inserting tab inserts into the slit to pivotably connect the operating member to the bending portion.

8. The mounting apparatus as claimed in claim 1, wherein a slot is defined in the first sidewall, the locking member further comprises an ear portion passing through the slot.

9. The mounting apparatus as claimed in claim 8, wherein a bending portion extends from a top of the first sidewall, a slit is defined in the bending portion, a inserting tab extends from a top of the locking member, the inserting tab inserts into the slit to pivotably connect the locking member to the bending portion.

10. An assembly, comprising:
a data storage device defining a fixing hole therein;
a mounting bracket for holding the data storage device comprising a sideboard, a first sidewall, the sideboard defining a through hole therein;
a locking member arranged between the sideboard and the first sidewall of the mounting bracket comprising a locking pin protruding therefrom, the locking pin inserted through the through hole of the mounting bracket for engaging in the fixing hole of the data storage device, a top of the locking member pivotably connected to the mounting bracket; and
an operating member arranged between the locking member and the first sidewall, the operating member comprising a resilient portion for pressing the locking member, and a first clip portion for clipping a bottom of the locking member, a top of the operating member pivotably connected to the mounting bracket.

11. The assembly as claimed in claim 10, wherein a flange extends out from a bottom of the sideboard, two locating tabs are arranged on the flange, the operating member further comprises a supporting portion located between the two locating tabs.

12. The assembly as claimed in claim 11, wherein the operating member still further comprises a locating protrusion, a first locating hole corresponding to the locating protrusion is defined in the flange between the two locating tabs.

13. The assembly as claimed in claim 12, wherein the mounting bracket further comprises a base wall perpendicular to the first sidewall, a second locating hole corresponding to the first locating hole of the flange is defined in the base wall.

14. The assembly as claimed in claim 10, wherein a through hole is defined in the first sidewall, the operating member further comprises a handle portion passing through the through hole.

15. The assembly as claimed in claim 10, wherein a bending portion extends from a top of the first sidewall, a slit is defined in the bending portion, a inserting tab extends from a tap of the operating member, the inserting tab inserts into the slit to pivotably connect the operating member to the bending portion.

16. The assembly as claimed in claim 10, wherein a bending portion extends from a top of the first sidewall, a slit is defined in the bending portion, a inserting tab extends from a top of the locking member, the inserting tab inserts into the slit to pivotably connect the locking member to the bending portion.

17. A mounting apparatus for mounting a data storage device that defines a fixing hole therein, the mounting apparatus comprising:
a mounting bracket comprising a bottom wall, a top wall, and a pair of sidewalls cooperatively forming a receiving space configured for holding the data storage device therein, one of the sidewalls defining an opening therein;
a locking member pivotably mounted to an inside of the one of the sidewalls, the locking member comprising a locking pin for engaging in the fixing hole of the data storage device; and
an operating member pivotably mounted to the inside of the one of the sidewalls, the operating member comprising a resilient portion for pressing the locking member inward, an operating portion extending out of the opening of the mounting bracket, and a first clip portion engaging with a portion of the locking member for drawing the locking member to pivot outward when the operating portion is pulled outward, wherein
the mounting bracket comprises a pair of locking structures at different positions and the locking member is capable of selectively pivotably engaging with any one of the locking structures to allow the locking pin of the locking member having two different positions.

18. The mounting apparatus as claimed in claim 17, wherein the mounting bracket further comprises a sideboard extending downward from the top wall for cooperating with the other of the sidewalls to sandwich the data storage device therebetween, the locking member and the operating member are located between the sideboard and the one of the sidewalls.

19. The mounting apparatus as claimed in claim 18, wherein the sideboard defines two through holes, the locking pin of the locking member being capable of selectively inserting through any one of the through holes.

20. The mounting apparatus as claimed in claim 18, wherein the mounting bracket further comprises a front wall defining an opening for providing an access to the data storage device to slide into the space, the bottom wall, the sidewalls, and the front wall being integrally formed, the top wall and the sideboard being integrally formed and secured to the front wall and the other of the sidewalls.

* * * * *